Patented Feb. 17, 1931

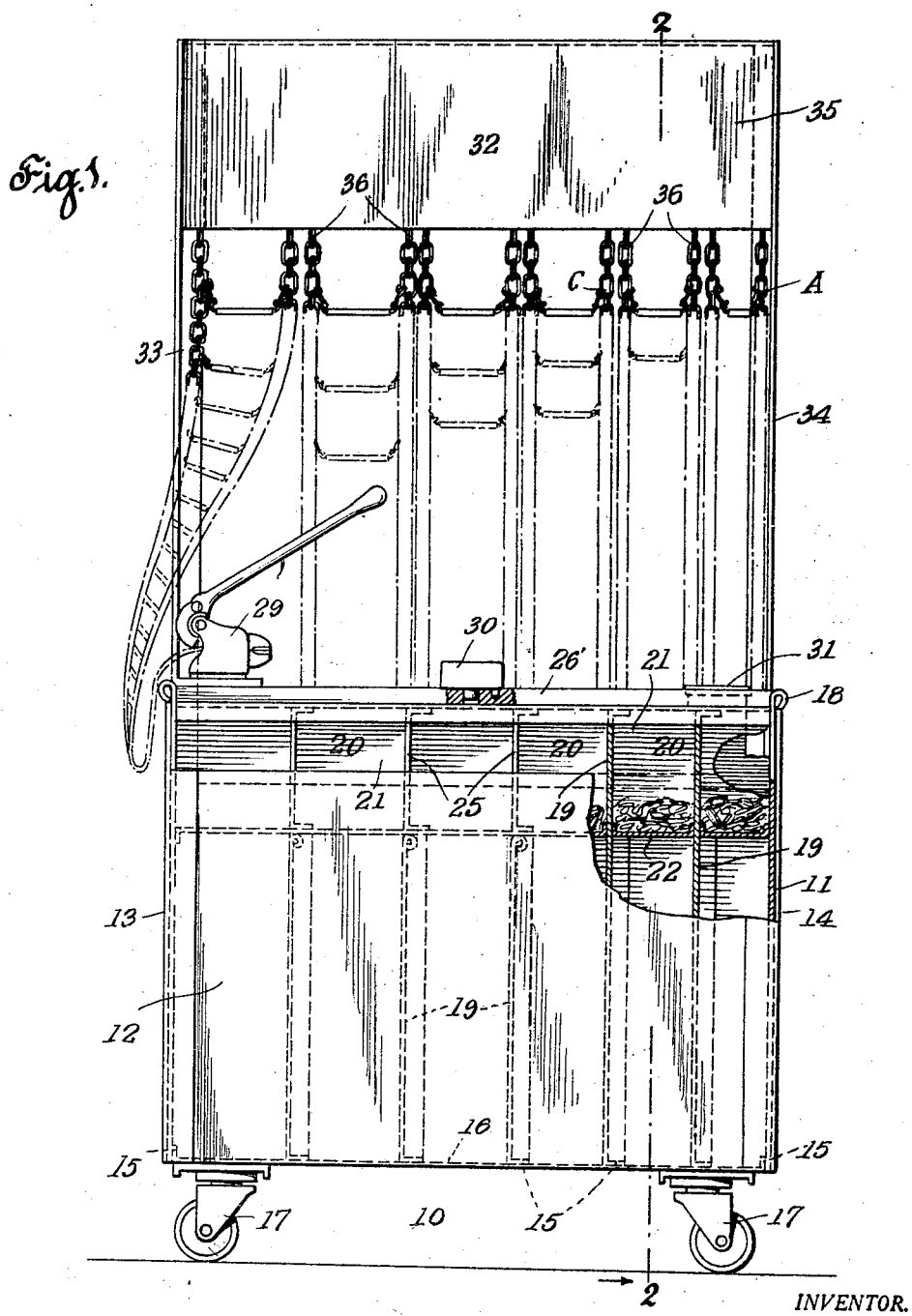

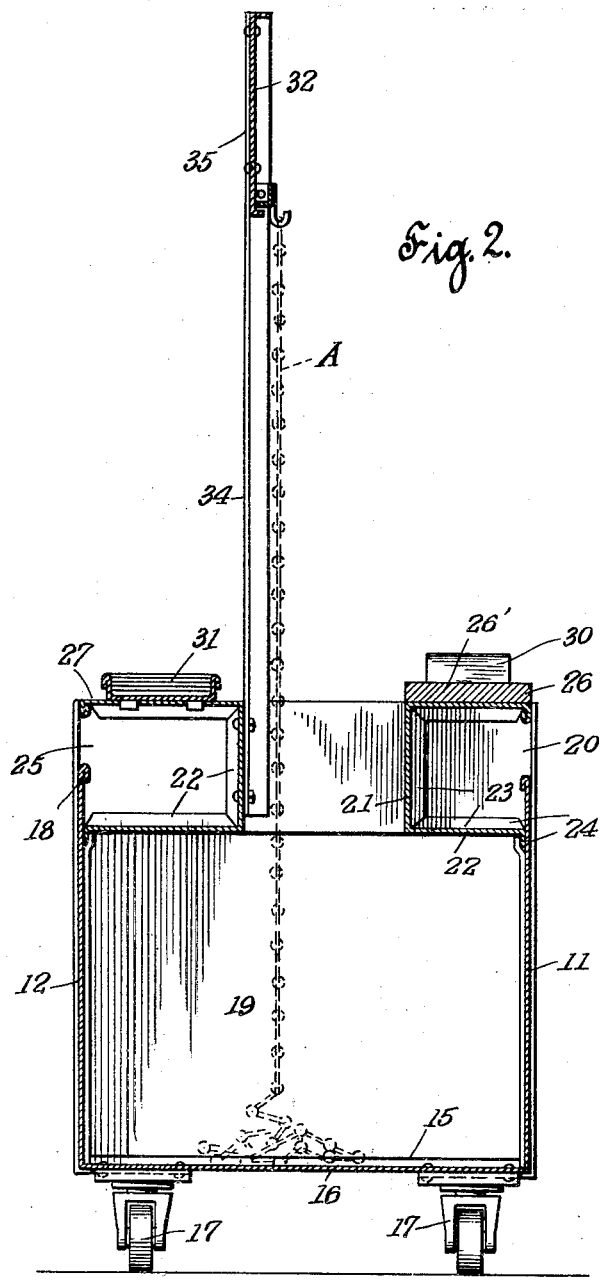

1,793,149

UNITED STATES PATENT OFFICE

HOWARD WILCOX, OF NEW YORK, N. Y., ASSIGNOR TO THE CHAIN PRODUCTS COMPANY, OF CLEVELAND, OHIO, A CORPORATION OF OHIO

METHOD OF FORMING TIRE CHAINS

Original application filed March 6, 1926, Serial No. 92,775. Divided and this application filed July 15, 1926. Serial No. 122,728.

The invention relates in general to a method of fabricating tire chains of a type which will be referred to hereinafter as a custom made tire chain and this application constitutes a division of my copending application, Serial No. 92,775, filed March 6, 1926.

There are in general use at the present time over sixty sizes of tires used on automotive vehicles and these tires differ from each other both in their circumferential lengths as well as in their widths. Ladder form tire chains of the type under discussion usually comprise two longitudinal or side members, their ends provided with fastening means for securing the side member to opposite sides of the tire, and these side members are connected by different forms of cross members spaced apart along the length of the tire chain. In the instant case these cross members are straight tubular tread members triangular in cross section of the type more specifically disclosed in the patent to Hoff, No. 1,499,579 granted July 1, 1924, but it will be obvious from the disclosure hereinafter that the invention may be practiced with other forms of tire chains. It is necessary, in order to obtain the most effective results in the use of tire chains of any of the usual types, that they be made accurately to a prescribed dimension in both length and width so as to have a nicety of fit on the particular tire for which they are designed. This means that the ideal condition would require a separate tire chain having a definite length and a definite width for each size of tire. As there are sixty or more sizes of tires in general use this means that the manufacturer is compelled to put out an equally large number of separate tire chain sizes. The average small dealer and garage man finds it to be economically impossible to carry in stock tire chains of all the requisite sizes. The dealer with limited financial resources finds it impossible to carry in stock a large number of tire chains many of which would be seldom if ever called for and would largely constitute inactive stock. The present practice is for the vender simply to carry a limited stock of those particular sizes which he is most likely to have a call for. When the purchaser asks for a tire chain to fit some particular size of tire, the dealer sells him that chain which comes nearest to fitting the tire in question. If the purchaser happens to have a tire which requires a chain different from the nearest chain which the dealer may happen to have in stock, it naturally results that there is lacking the desirable accuracy of fit between such substituted tire chain and the tire.

The primary object of the invention is to provide a simplified and economically practiable method by means of which any dealer or garage man can readily construct on demand, and promptly vend a custom made tire chain particularly designed to fit any given size of tire. This object of the invention is attained by supplying the vendor with a few sizes of different widths of long stock chain so as to give the requisite variations in width required by the different size tires, and for him to cut off from a selected width of such stock chain the requisite length necessary so that when supplied with the necessary fasteners, there is provided the required accuracy of fit between the tire chain thus formed and the particular tire which it is designed to fit. It has been found that, insofar as the widths are concerned, a half dozen or so of sizes of different widths are ample to fit the requirements in this respect for the tires now in general use and, as a matter of fact, the need for accuracy of fit in tire chains is more in the length measured circumferentially of the tire than in the width.

It is accordingly proposed to supply the local dealers with long lengths of stock chain and of about a half dozen different widths. With such a stock supply the dealer is enabled by cutting off proper lengths, by securing additional links where indicated, and by finishing the ends with suitable fasteners to construct, on demand, the proper size tire chain to fit practically any size of tires.

The invention contemplates the providing by the manufacturers of a chart giving tire sizes together with directions for selecting the proper width of stock chain and the length or number of cross members which should be present in the tire chain for each given size of tire. As the cross member chains or other form of tread elements are usually spaced apart equally in the form selected for illustration, the invention features the use of the cross members as measurers of the desired circumferential length so that the chart can indicate the number of cross members for each tire chain thus providing a convenient means for measuring the proper length of stock chain which should be cut off to give the required length of tire chain. Where the requisite length of any particular tire chain is a length greater than the distance between two cross members any additional fractional length may be obtained by adding to the cut off length one or more of the links which go to make up the side chains. In making up such direction charts, the length added by the fasteners or coupling link at one end of each side chain is taken into consideration, so that when completed according to the directions on the chart for a particular tire, the tire chain so constructed will have the accuracy of fit prescribed by the manufacturer.

The successful operation of such a method of fabricating tire chain depends to a large extent upon the ease with which it can be practised by the unskilled vendors or workman.

Accordingly, another object of the invention is to provide a simplified instrumentality by means of which the method may be practised conveniently and economically. This aspect of the invention is attained by the manufacturer providing the vendor with a sales cabinet which can be equipped to contain and display the chain stock and which cabinet will be equipped with a work bench and with the necessary tools and accessories to complete from the chain stock in the cabinet, the custom made tire chain proper for the particular tire which it is designed to fit.

Various other objects and advantages of the invention will be obvious from a consideration of the preferred method of practising the invention hereinafter described and from an inspection of the accompanying drawings and in part will be more fully set forth in the following particular description of one method and of one form of vending cabinet for use in practising the method and the invention also consists in certain new and novel operations and features of construction and combination of parts hereinafter set forth and claimed.

In the accompanying drawings,

Fig. 1 is a view in rear elevation of a vending cabinet constituting a preferred embodiment of the physical aspects of the invention and illustrating an instrumentality by means of which the method feature of the invention may be practised and showing certain parts broken away to disclose internal construction and with other parts shown in dotted outline; and Fig. 2 is a vertical sectional view taken on the line 2—2 of Fig. 1 looking in the direction indicated by the arrow and with the adjacent partition partially broken away and with parts omitted.

In the drawings, there is shown a portable work bench and vending unit in the form of a rectangular and substantially cubical form of metal bin 10 comprising a front side 11, rear side 12 and end sides 13 and 14. These sides are formed each of sheet metal flanged along certain edges and secured along their contacting edges by welding or by means of rivets or screws extending through the flanges. A sheet metal bottom 16 is flanged and is provided with upturned flanges 15 and secured thereby to the end sides 13 and 14. Secured to each corner of the bottom is a pivoting supporting caster 17, thus forming a four wheel support for the bin. The upper edge of each of the front, rear and end sides is turned back upon itself to form a bead 18 which reinforces the upper edges of the bin, provides a neat finish and prevents the formation of sharp edges.

The interior of the bin is divided by means of vertically extending, parallel partitions 19 to form a plurality of narrow, stock-chain-receiving wells. These partitions extend from the front to the rear sides of the bin and act additionally to provide internal reinforcement to the bin as a whole. These wells are designed to carry stock chains of varying widths and accordingly the partitions are unequally spaced apart and are preferably arranged with progressively greater spacing from one side so that the largest width of stock chain may be contained in one end as shown at the left of Fig. 1 and the smallest width at the opposite end and with the chain widths progressing in size from one to the other end side of the bin. At the front and rear side of each well and at the top thereof are formed accessory containing pockets 20 for carrying all of the stock parts, except the long stock chains which are each contained in their appropriate wells. These pockets 20 are formed of sheet metal bent into an L-shape to form a back 21 and flat bottom 22, each provided with flanges 23 by means of which it is secured to and between the adjacent partitions. A flange 24 depending from the front edge of the bottom 22 abuts and is secured to the front or rear sides as the case may be.

The front and rear walls terminate below the top of the bin so as to provide openings 25 permitting ready access to each of the pockets through the sides of the bin.

Positioned on top of the bin and disposed over the pockets at each side is a counter and work table, preferably sheet metal flanged at their edges and beaded at their front edges, the rear one constituting a work bench or table 26 and the one at the front of the bin constituting a counter 27. The work bench may include a top member 26' preferably a board of hard wood. These tables are spaced apart so as to form an opening 28 at the center of the top of each well.

A plurality of tools necessary to practise the invention herein disclosed is positioned on the work table, there being shown, for instance, a cutter 29 for severing the stock chain and an anvil 30 to assist in hammering the parts together. The counter 27 may be left free for any desired use and it is herein suggested that trays 31 for holding advertising matter may be positioned at opposite ends of the counter.

Supported above the bin is a superstructure 32 which includes a pair of angle bar uprights 33 and 34 secured to the bin at opposite ends thereof and bolted to the rear wall of the adjacent pocket as shown in Fig. 2. A sign support 35 extends between the upper ends of the uprights and provides a convenient means for carrying signs and advertising matter.

This sign support has depending therefrom a plurality of chain supports, one set of supports for each of the bins positioned therebelow. These supports are in the form of hooks 36 which are in each instance spaced apart a distance proportionate to the width of the chain stock to be hung thereon.

By utilizing the cabinet herein disclosed, the operation is facilitated in that the free end of each of the stock chains is conveniently accessible and the operator is relieved from fishing into the bin to find the end of the stock chain. In practise, the operator finds it convenient to leave the end of the chain in position on the support until he has counted off the requisite number of cross members and has severed the short length from the remaining portion of the stock chain. The severed portion can then be unhooked from the support and the end of the remaining stock chain inserted in its place. Any usual length of chain to be cut off will reach from the support to the cutter at 29 and surplus chain can be hung in a loop over one of the sides of the bin as illustrated in dotted outline in Fig. 1. As the end of each stock chain is approached, a fresh supply of stock chain which, in the instant case is supplied in packages of a hundred foot length or more is introduced into the appropriate well and secured by means of one of the side chain coupling links to whatever short length of stock may be remaining in or above the well.

The wear on a chain of the type disclosed occurs largely at the cross members. Should a customer desire to have one or more cross members of his old tire chain replaced by new cross members, the old, worn members are removed at their link connection with the side chain and the proper size new cross member selected from stock and replaced in position in the tire chain. Similarly a worn or broken side chain link or fastener may be replaced.

In the illustrated form, six different widths of stock chain are supplied with the cabinet and in each the pockets at one side are contained cross member units, each pocket containing a cross unit of a different size. The pockets upon the opposite side of the bin are provided with additional links, and with fasteners or coupling links, these being all that are necessary to practise the method herein featured.

For illustration, let it be assumed that the purchaser asks for a tire chain for a 30 x 3½ tire. The operator, consulting the chart, would find that there is prescribed a small size of stock chain, marked size "A" on the chart. The chart would direct him to count off eighteen cross members and to sever the stock chain at a link beyond the eighteenth cross member. The operator would then attach a fastener to one end of each side chain and the article would be complete and ready for immediate delivery to the customer.

As another illustration, let it be assumed that the customer asked for a tire chain to fit a 32 x 4 high pressure cord tire. By reference to the chart, the operator would find a note to the effect that high pressure tires marked "4" actually measure 4¼ to 4½ inches and he would be instructed to select stock chain "C" the tread member of which is of the length prescribed for tires of this size. The chart would instruct him to count off eighteen cross members and to add an extra coupling link to each of the side chains after they have been severed beyond the eighteenth cross member. A fastener is then added to this extra link and again the proper size of tire chain is ready for delivery to the customer.

In this way tire chain to fit any usual size of tire may be constructed as a custom-made article particularly designed to have the fit prescribed by the manufacturer for the particular size of tire selected for a fitting.

Worn parts of old chains can be readily replaced without necessity of using any special equipment and even without necessity of using the special cabinet herein disclosed.

In order to supply tire chains for all usual sizes of tires it is necessary to carry in stock only a half dozen or so of different size chain stock and to order from time to time that particular size for which there is the greatest demand and the some applies to the coupling link cross members and fastener.

Having thus described my invention, I claim:

1. The method of manipulating a long length of stock ladder-form chain stored in a container, for the purpose of forming tire chains therefrom, consisting in elevating the leading end thereof and securing the same to a superstructure to expose in depending position a stretch thereof, withdrawing a loop of the stock chain from the container without disturbing the attachment of its leading end to the superstructure, severing the loop at the proper point to form the desired length of tire chain, attaching fastening means to the depending end of the severed piece without disturbing its attachment to the superstructure, removing the completed tire chain, and elevating and securing the leading end of the remaining stock chain to the superstructure.

2. The method of manipulating long lengths of varying sizes of stock ladder-form chain stored in a container having an upper working surface for supporting a chain manipulating tool, for the purpose of forming custom-made tire chains, consisting in elevating the leading ends of the various lengths and securing the ends to a superstructure to expose in grouped relation depending stretches of the various sides, withdrawing a loop of a selected size of stock chain from the container without disturbing the attachment of its leading end to the superstructure, severing the loop with said tool at the proper point to form the desired length of tire chain, attaching fastening means to the depending end of the severed piece without disturbing its attachment to the superstructure, removing the completed tire chain, and elevating and securing the leading end of the remaining stock chain to the superstructure.

Signed at New York, in the county of New York and State of New York this 30th day of June A. D. 1926.

HOWARD WILCOX.